(12) United States Patent
Hayakawa (10) Patent No.: US 12,556,209 B2
(45) Date of Patent: Feb. 17, 2026

(54) RADIO-FREQUENCY MODULE AND COMMUNICATION DEVICE

(71) Applicant: Murata Manufacturing Co., Ltd., Nagaokakyo (JP)

(72) Inventor: Masashi Hayakawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 356 days.

(21) Appl. No.: 18/320,215

(22) Filed: May 19, 2023

(65) Prior Publication Data

US 2023/0308122 A1 Sep. 28, 2023

Related U.S. Application Data

(63) Continuation of application No. PCT/JP2021/045529, filed on Dec. 10, 2021.

(30) Foreign Application Priority Data

Dec. 16, 2020 (JP) .................. 2020-208713

(51) Int. Cl.
*H04B 1/04* (2006.01)
*H01Q 1/22* (2006.01)
*H04B 1/16* (2006.01)

(52) U.S. Cl.
CPC ............ *H04B 1/04* (2013.01); *H01Q 1/2283* (2013.01); *H04B 1/1607* (2013.01)

(58) Field of Classification Search
CPC .......... H04B 1/04; H04B 1/1607; H04B 1/38; H01Q 1/2283; H01L 25/04; H01L 25/18; H05K 1/02; H05K 3/46
See application file for complete search history.

(56) References Cited

U.S. PATENT DOCUMENTS 7,332,808 B2 * 2/2008 Sakamoto ............ G01D 11/245
257/E25.011
10,011,098 B2 * 7/2018 Yu ........................ H01L 24/96
(Continued)

FOREIGN PATENT DOCUMENTS

JP 2002-231761 A 8/2002
JP 2004-363379 A 12/2004
(Continued)

OTHER PUBLICATIONS

International Search Report and Written Opinion mailed on Mar. 8, 2022, received for PCT Application PCT/JP2021/045529, filed on Dec. 10, 2021, 10 pages including English Translation.

*Primary Examiner* — Santiago Garcia
(74) *Attorney, Agent, or Firm* — XSENSUS LLP (57) ABSTRACT

A radio-frequency module includes a mounting board, a plurality of electronic components (for example, first matching circuits, filters, and second matching circuits, and a plurality of external connection terminals. The plurality of external connection terminals include a first external connection terminal. The mounting board has a first region and a second region. A gap is formed between the first region and the second region at a second major surface. The first external connection terminal is surrounded by an edge of the mounting board and the gap when viewed in plan view in a thickness direction of the mounting board.

20 Claims, 6 Drawing Sheets

(56) References Cited

U.S. PATENT DOCUMENTS

| | | | | |
|---|---|---|---|---|
| 2004/0104469 A1* | 6/2004 | Yagi | ........................ | H01L 25/18 |
| | | | | 257/723 |
| 2004/0188827 A1* | 9/2004 | Akashi | ................. | H01L 23/4334 |
| | | | | 257/E23.092 |
| 2005/0212078 A1* | 9/2005 | Kwon | ...................... | H01L 23/66 |
| | | | | 257/E25.031 |
| 2005/0248039 A1* | 11/2005 | Miura | ...................... | H01L 24/48 |
| | | | | 257/E23.125 |
| 2007/0096291 A1* | 5/2007 | Kawabata | ............. | H01L 25/105 |
| | | | | 257/E25.023 |
| 2007/0235864 A1* | 10/2007 | Megahed | ............ | H01L 25/0652 |
| | | | | 257/E23.07 |
| 2010/0001389 A1* | 1/2010 | Chen | ........................ | H01L 24/97 |
| | | | | 257/E23.068 |
| 2010/0133349 A1* | 6/2010 | Shingai | ................... | H01L 23/66 |
| | | | | 29/601 |
| 2011/0037170 A1* | 2/2011 | Shinohara | ............. | H01L 21/565 |
| | | | | 257/737 |
| 2016/0093550 A1* | 3/2016 | Kumagai | ............. | H05K 7/2039 |
| | | | | 257/713 |
| 2018/0096949 A1* | 4/2018 | Chen | .................. | H01L 21/76802 |
| 2019/0020343 A1* | 1/2019 | Lee | ........................ | H01L 24/19 |
| 2019/0189565 A1* | 6/2019 | Chen | ..................... | H01L 21/565 |
| 2020/0075439 A1* | 3/2020 | Watanabe | ............... | H01L 24/83 |
| 2021/0203371 A1* | 7/2021 | Hanaoka | ................. | H01L 25/18 |
| 2021/0257332 A1* | 8/2021 | Homma | ................. | H01L 24/11 |

FOREIGN PATENT DOCUMENTS

| | | |
|---|---|---|
| JP | 2018-137522 A | 8/2018 |
| WO | 2012/101920 A1 | 8/2012 |
| WO | 2018/110383 A1 | 6/2018 |
| WO | 2020/071020 A1 | 4/2020 |

\* cited by examiner

RADIO-FREQUENCY MODULE AND COMMUNICATION DEVICE

CROSS-REFERENCE TO RELATED APPLICATIONS

The present application is a national stage entry of PCT/JP2021/045529, filed on Dec. 10, 2021, which claims priority to Japanese Patent Application 2020-208713, filed on Dec. 16, 2020, the entire contents of all of which are incorporated herein by reference.

TECHNICAL FIELD

The present disclosure generally relates to radio-frequency modules and communication devices, and more particularly, to a radio-frequency module including a mounting board with multiple electronic components mounted, and a communication device.

BACKGROUND ART

Radio-frequency modules formed by integrating elements such as an amplifier, a switch, and a filter into a module have been known for some time (see Patent Document 1).

Patent Document 1 describes a radio-frequency module including power amplifiers, low-noise amplifiers, switches, and filters.

CITATION LIST

Patent Document

Patent Document 1: Japanese Unexamined Patent Application Publication No. 2018-137522

SUMMARY OF DISCLOSURE

Technical Problem

When a radio-frequency module is mounted on a motherboard, the possibility exists that heat generated in the radio-frequency module can degrade characteristics under temperature cycling conditions.

The present disclosure has been made in consideration of the above problem, and an object thereof is to provide a radio-frequency module and a communication device in which degradation of characteristics under temperature cycling conditions is suppressed.

Solution to Problem

A radio-frequency module according to an aspect of the present disclosure includes a mounting board, a first electronic component, and a plurality of external connection terminals. The mounting board has a first major surface and a second major surface that are opposite to each other. The first electronic component is disposed on the first major surface. The plurality of external connection terminals are disposed on the second major surface. The plurality of external connection terminals include a first external connection terminal that is positioned nearest to a corner of the mounting board among the plurality of external connection terminals when viewed in plan view in a thickness direction of the mounting board. The mounting board has a first region and a second region. The first external connection terminal is positioned in the first region when viewed in plan view in the thickness direction of the mounting board. The first electronic component is positioned in the second region when viewed in plan view in the thickness direction of the mounting board. In the mounting board, a gap is formed at the second major surface between the first region and the second region. The first external connection terminal is surrounded by an edge of the mounting board and the gap when viewed in plan view in the thickness direction of the mounting board.

A communication device according to an aspect of the present disclosure includes the radio-frequency module and a signal processing circuit configured to process a signal transferred or to be transferred through the radio-frequency module.

Advantageous Effects of Disclosure

The present disclosure suppresses degradation of characteristics under temperature cycling conditions.

DESCRIPTION OF EMBODIMENTS

FIGS. 2A to 7, which are referred to in the following embodiment and modifications, are all schematic drawings, and the proportion of size and thickness of each constituent element in the drawings is not necessarily identical to the corresponding proportion in actual measurements.

Embodiment

The following describes a radio-frequency module 1 according to an embodiment and a communication device 500 with reference to FIGS. 1 to 3B.

(1) Outline

Figure 1:
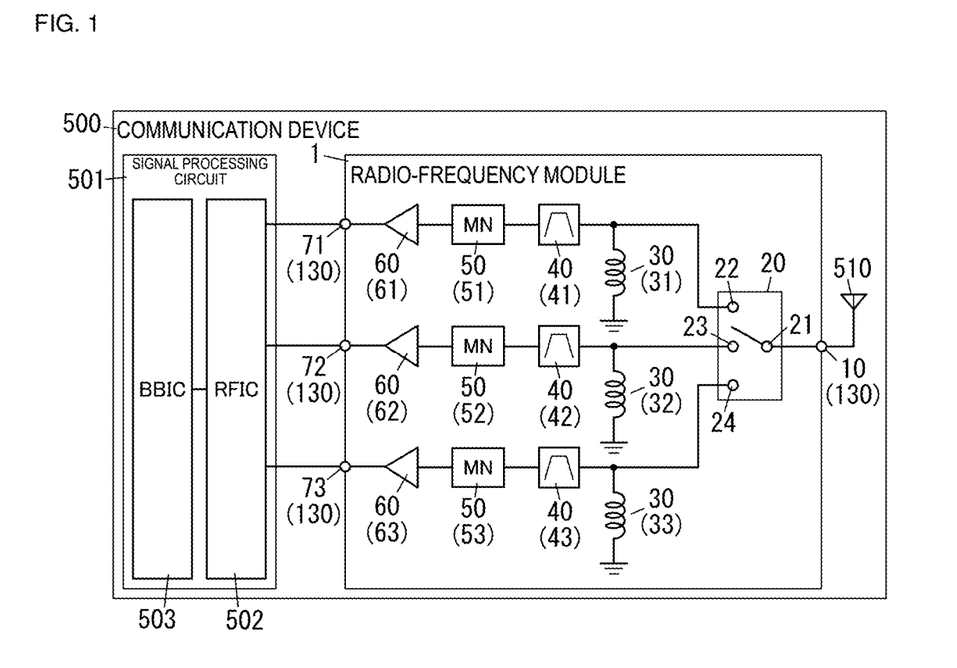
FIG. 1 is a schematic circuit diagram illustrating a radio-frequency module according to an embodiment.

The radio-frequency module 1 includes, as illustrated in FIG. 1, an antenna terminal 10, a switch 20, a plurality (three in the example in the drawing) of first matching circuits 30, a plurality (three in the example in the drawing) of filters 40, a plurality (three in the example in the drawing) of second matching circuits 50, and a plurality (three in the example in the drawing) of low-noise amplifiers 60. The filters 40 are receive filters for passing receive signals (radio-frequency signals) in particular frequency bands. The radio-frequency module 1 further includes a mounting board 100 (see, for example, FIG. 2A). The mounting board 100 has a first major surface 101 and a second major surface 102 that are opposite to each other in a thickness direction D1 (see, for example, FIG. 3A).

In the following, when the first matching circuits 30 are to be distinguished, the first matching circuits 30 are individually referred to as first matching circuits 31, 32, and 33. When the filters 40 are to be distinguished, the filters 40 are individually referred to as filters 41, 42, and 43. When the second matching circuits 50 are to be distinguished, the second matching circuits 50 are individually referred to as second matching circuits 51, 52, and 53. When the low-noise amplifiers 60 are to be distinguished, the low-noise amplifiers 60 are individually referred to as low-noise amplifiers 61, 62, and 63.

The antenna terminal 10 is electrically coupled to an antenna 510 (see FIG. 1). The switch 20 is configured such that the filters 40 are able to be coupled to the antenna 510. The switch 20 is configured such that at least two of the filters 40 are simultaneously able to be coupled to the antenna 510. For example, simultaneously coupling the filters 41 and 42 enables simultaneous communication using the filters 41 and 42. The expression "enables simultaneous communication" means that simultaneous communication is enabled in the frequency bands in which simultaneous communication is allowed in accordance with the Third Generation Partnership Project (3GPP) Long Term Evolution (LTE) standards.

Figure 3A:
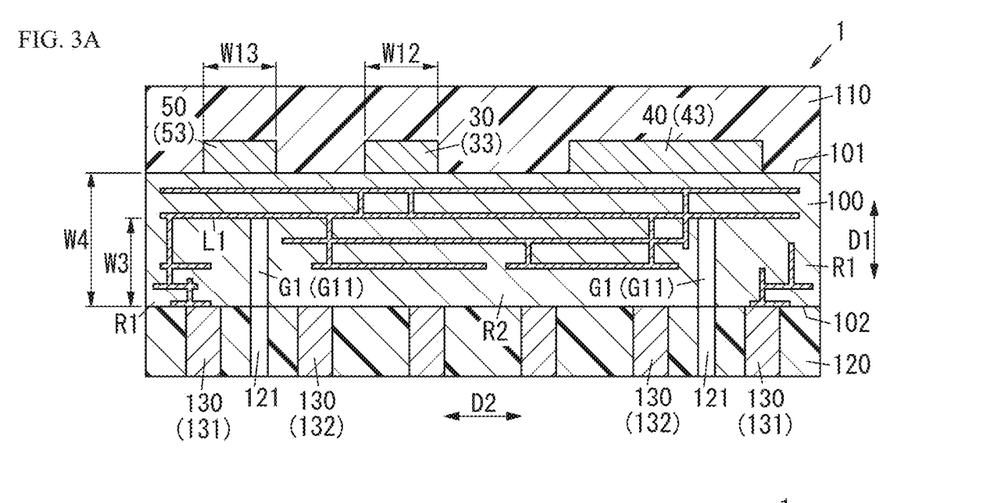
FIG. 3A is a sectional view taken along line X1-X1 in FIG. 2A.
Figure 3B:
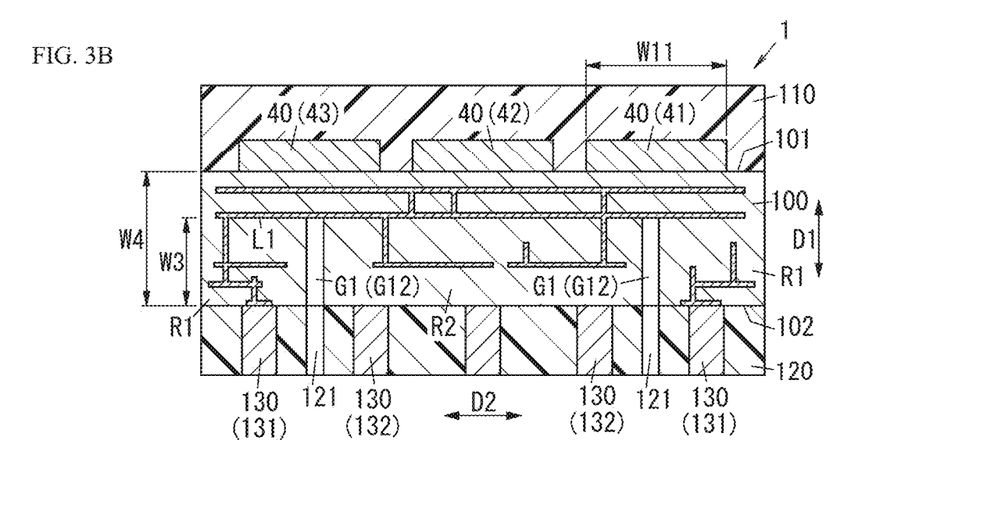
FIG. 3B is a sectional view taken along line X2-X2 in FIG. 2A.

In the radio-frequency module 1, a plurality of electronic components are mounted on the first major surface 101 or the second major surface 102 of the mounting board 100. As used herein, the expression "electronic components are mounted on the first major surface 101 (or the second major surface 102) of the mounting board 100" includes the case in which an electronic component is disposed on (mechanically coupled to) the mounting board 100 and the case in which an electronic component is electrically coupled to (a corresponding conductive portion of) the mounting board 100. In this manner, in the radio-frequency module 1, the individual electronic components are disposed on the first major surface 101 or the second major surface 102 of the mounting board 100. The electronic components are not limited to electronic components mounted over the mounting board 100; the electronic components may include a circuit element provided inside the mounting board 100. FIGS. 3A and 3B do not illustrate a plurality of interconnections implemented by, for example, conductive portions of the mounting board 100 described above and via-conductors.

(2) Configuration

The following describes a configuration of the radio-frequency module 1 according to the present embodiment and the communication device 500 with reference to FIGS. 1 to 3B.

The radio-frequency module 1 according to the present embodiment is used in, for example, the communication device 500. The communication device 500 may be, for example, a mobile phone (for example, a smartphone). The communication device 500 is not limited to this example and may be a wearable device (for example, a smartwatch). The radio-frequency module 1 can support the fourth generation (4G) and fifth generation (5G) technology standards for cellular networks. The 4G standards are, for example, the 3GPP LTE standards. The 5G standards are, for example, 5G New Radio (NR). The radio-frequency module 1 enables, for example, carrier aggregation and dual connectivity. Here, carrier aggregation and dual connectivity mean communications simultaneously using radio waves in a plurality of frequency bands. In the radio-frequency module 1 according to the present embodiment, of the plurality of filters 40, at least two filters 40 are simultaneously able to be coupled using the switch 20. Specifically, in the radio-frequency module 1 according to the present embodiment, it is possible to perform communication in which, for example, a first receive signal in a first frequency band that the filter 41 passes and a second receive signal in a second frequency band that the filter 42 passes are simultaneously received.

The radio-frequency module 1 is configured to, for example, amplify a receive signal (a radio-frequency signal) inputted from the antenna 510 and outputs the receive signal to a signal processing circuit 501. The signal processing circuit 501 is not a constituent element of the radio-frequency module 1; the signal processing circuit 501 is a constituent element of the communication device 500 including the radio-frequency module 1. The radio-frequency module 1 is controlled by, for example, the signal processing circuit 501 included in the communication device 500. The communication device 500 includes the radio-frequency module 1 and the signal processing circuit 501. The communication device 500 further includes the antenna 510. The communication device 500 further includes a circuit board having the radio-frequency module 1. The circuit board is, for example, a printed-circuit board. The circuit board has a ground electrode to which a ground potential is supplied.

The signal processing circuit 501 processes a signal (for example, a receive signal, a transmit signal) transferred or to be transferred through the radio-frequency module. The signal processing circuit 501 includes, for example, a radio-frequency (RF) signal processing circuit 502 and a baseband signal processing circuit 503. The RF signal processing circuit 502 is, for example, a radio frequency integrated circuit (RFIC) and processes radio-frequency signals. The RF signal processing circuit 502 processes by, for example, up-conversion a radio-frequency signal (transmit signal) outputted by the baseband signal processing circuit 503 and outputs the processed radio-frequency signal. The RF signal processing circuit 502 also processes by, for example, down-conversion a radio-frequency signal (receive signal) outputted by the radio-frequency module 1 and outputs the processed radio-frequency signal to the baseband signal processing circuit 503.

The baseband signal processing circuit 503 is, for example, a baseband integrated circuit (BBIC). The baseband signal processing circuit 503 generates an in-phase signal and a quadrature signal from a baseband signal. The baseband signal is, for example, a sound signal or image signal inputted from outside. The baseband signal processing circuit 503 performs IQ modulation by adding an in-phase signal and a quadrature signal together and outputs a transmit signal. At this time, the transmit signal is a modulated signal (IQ signal) generated by amplitude modulating a carrier wave signal of a given frequency by a period longer than the period of the carrier wave signal. The receive signal processed by the baseband signal processing circuit 503 is used as, for example, an image signal for image display or a sound signal for calls. The radio-frequency module 1 according to the present embodiment transfers a radio-frequency signal (a receive signal) between the antenna 510 and the RF signal processing circuit 502 of the signal processing circuit 501.

The radio-frequency module 1 includes, as illustrated in FIG. 1, the antenna terminal 10, the switch 20, a plurality (three in the example in the drawing) of first matching circuits 30, a plurality (three in the example in the drawing)

of filters 40, a plurality (three in the example in the drawing) of second matching circuits 50, and a plurality (three in the example in the drawing) of low-noise amplifiers 60. The radio-frequency module 1 further includes, as illustrated in FIG. 1, a plurality (three in the example in the drawing) of signal output terminals 71, 72, and 73.

The antenna terminal 10 is electrically coupled to the antenna 510.

The switch 20 is electrically coupled to the antenna terminal 10. The switch 20 is electrically coupled to the filters 40. Specifically, the switch 20 has a common terminal 21 and a plurality (three in the example in the drawing) of selection terminals 22, 23, and 24. Under the control of the signal processing circuit 501, the switch 20 selects at least one of the selection terminals 22, 23, or 24 as a connection destination of the common terminal 21. This means that the switch 20 electrically couples the filters 41, 42, and 43 to the antenna 510 in a selective manner. The common terminal 21 is electrically coupled to the antenna terminal 10. This means that the common terminal 21 is electrically coupled to the antenna 510 via the antenna terminal 10. The common terminal 21 is not necessarily coupled directly to the antenna 510. For example, a filter or coupler may be provided between the common terminal 21 and the antenna 510. The selection terminal 22 is electrically coupled to the filter 41. The selection terminal 23 is electrically coupled to the filter 42. The selection terminal 24 is electrically coupled to the filter 43. For example, the switch 20 can be simultaneously coupled to the antenna terminal 10 and the filters 41 and 42.

The individual first matching circuits 30 are, for example, inductors. The first matching circuits 30 are electrically coupled in the respective paths between the switch 20 and the filters 40, and the first matching circuits 30 provide impedance matching between the switch 20 and the filters 40. The first matching circuit 31 is electrically coupled in the path between the selection terminal 22 of the switch 20 and the filter 41, and the first matching circuit 31 provides impedance matching between the switch 20 and the filter 41. One end of the first matching circuit 31 is electrically coupled to the path between the selection terminal 22 and the filter 41, and the other end of the first matching circuit 31 is electrically grounded. The first matching circuit 32 is electrically coupled in the path between the selection terminal 23 of the switch 20 and the filter 42, and the first matching circuit 32 provides impedance matching between the switch 20 and the filter 42. One end of the first matching circuit 32 is electrically coupled to the path between the selection terminal 23 and the filter 42, and the other end of the first matching circuit 32 is electrically grounded. The first matching circuit 33 is electrically coupled in the path between the selection terminal 24 of the switch 20 and the filter 43, and the first matching circuit 33 provides impedance matching between the switch 20 and the filter 43. One end of the first matching circuit 33 is electrically coupled to the path between the selection terminal 24 and the filter 43, and the other end of the first matching circuit 33 is electrically grounded.

The filters 40 are receive filters for passing receive signals in particular frequency bands received by the antenna 510. The filters 40 are, for example, ladder filters and each include a plurality of (for example, four) series arm resonators and a plurality of (for example, three) parallel arm resonators. The filters 40 are, for example, acoustic wave filters. In the acoustic wave filter, a plurality of series arm resonators and a plurality of parallel arm resonators are individually formed by acoustic wave resonators. The acoustic wave filter is, for example, a surface acoustic wave filter using surface acoustic waves. In the surface acoustic wave filter, the plurality of series arm resonators and the plurality of parallel arm resonators are, for example, surface acoustic wave (SAW) resonators. The filters 40 are not limited to SAW filters. The filters 40 may be filters other than SAW filters, such as bulk acoustic wave (BAW) filters. A resonator in the BAW filter is, for example, a film bulk acoustic resonator (FBAR) or solidly mounted resonator (SMR). The BAW filter includes a substrate. The substrate included in the BAW filter is, for example, a silicon substrate.

The filters 40 are electrically coupled to the switch 20. The filters 40 are electrically coupled to the second matching circuits 50 in one-to-one correspondence. Specifically, an input terminal of the filter 41 is electrically coupled to the selection terminal 22 of the switch 20, and an output terminal of the filter 41 is electrically coupled to the second matching circuit 51. An input terminal of the filter 42 is electrically coupled to the selection terminal 23 of the switch 20, and an output terminal of the filter 42 is electrically coupled to the second matching circuit 52. An input terminal of the filter 43 is electrically coupled to the selection terminal 24 of the switch 20, and an output terminal of the filter 43 is electrically coupled to the second matching circuit 53.

The second matching circuits 50 are electrically coupled to the filters 40 in one-to-one correspondence. The second matching circuits 50 are electrically coupled to the low-noise amplifiers 60 in one-to-one correspondence. An input terminal of the second matching circuit 51 is electrically coupled to the filter 41, and an output terminal of the second matching circuit 51 is electrically coupled to the low-noise amplifier 61. The second matching circuit 51 provides impedance matching between the low-noise amplifier 61 and the filter 41. An input terminal of the second matching circuit 52 is electrically coupled to the filter 42, and an output terminal of the second matching circuit 52 is electrically coupled to the low-noise amplifier 62. The second matching circuit 52 provides impedance matching between the low-noise amplifier 62 and the filter 42. An input terminal of the second matching circuit 53 is electrically coupled to the filter 43, and an output terminal of the second matching circuit 53 is electrically coupled to the low-noise amplifier 63. The second matching circuit 53 provides impedance matching between the low-noise amplifier 63 and the filter 43.

The low-noise amplifiers 60 amplify receive signals. The low-noise amplifier 61 amplifies a receive signal having passed through the filter 41. The low-noise amplifier 62 amplifies a receive signal having passed through the filter 42. The low-noise amplifier 63 amplifies a receive signal having passed through the filter 43. An input terminal of the low-noise amplifier 61 is electrically coupled to the second matching circuit 51, and an output terminal of the low-noise amplifier 61 is electrically coupled to the signal output terminal 71. An input terminal of the low-noise amplifier 62 is electrically coupled to the second matching circuit 52, and an output terminal of the low-noise amplifier 62 is electrically coupled to the signal output terminal 72. An input terminal of the low-noise amplifier 63 is electrically coupled to the second matching circuit 53, and an output terminal of the low-noise amplifier 63 is electrically coupled to the signal output terminal 73.

The signal output terminals 71, 72, and 73 are electrically coupled to the RF signal processing circuit 502. Specifically, the low-noise amplifier 61 is electrically coupled to the RF signal processing circuit 502 via the signal output terminal 71; the low-noise amplifier 62 is electrically coupled to the RF signal processing circuit 502 via the signal output terminal 72; and the low-noise amplifier 63 is electrically coupled to the RF signal processing circuit 502 via the signal output terminal 73.

The low-noise amplifiers 60 and the switch 20 are integrated into a switch integrated circuit (IC) 80 (a second electronic component) that is made as an electronic component in the form of a single chip. The switch IC 80 is disposed on the second major surface 102 of the mounting board 100 (see FIG. 2B).

The radio-frequency module 1 further includes the mounting board 100 (see FIGS. 2A to 3B).

The mounting board 100 has the first major surface 101 and the second major surface 102 that are opposite to each other in the thickness direction D1 of the mounting board 100. The mounting board 100 may be, for example, a printed-circuit board, low temperature co-fired ceramics (LTCC) substrate, high temperature co-fired ceramics (HTCC) substrate, or resin multilayer substrate. In this instance, the mounting board 100, for example, is a multilayer substrate including a plurality of dielectric layers and a plurality of conductive layers and is a ceramic substrate. The dielectric layers and the conductive layers are stacked in the thickness direction D1 of the mounting board 100. The conductive layers are shaped in particular patterns designed for the respective conductive layers. The conductive layers each include one or a plurality of conductive portions in one plane perpendicular to the thickness direction D1 of the mounting board 100. The material of the conductive layers is, for example, copper. The conductive layers include a ground layer. In the radio-frequency module 1, one or more ground terminals included in a plurality of external connection terminals 130 (see FIG. 2B) and the ground layer are electrically coupled to each other via, for example, via-conductors in the mounting board 100.

The mounting board 100 is not limited to a printed-circuit board or LTCC substrate; the mounting board 100 may be an interconnection structure. The interconnection structure is, for example, a multilayer structure. The multilayer structure includes at least one insulating layer and at least one conductive layer. The insulating layer is shaped in a particular pattern. When a plurality of insulating layers are included, the insulating layers are shaped in particular patterns designed for the respective insulating layers. The conductive layer is shaped in a particular pattern different from the particular pattern of the insulating layer. When a plurality of conductive layers are included, the conductive layers are shaped in particular patterns designed for the respective conductive layers. The conductive layer may include one or a plurality of redistribution portions. In the interconnection structure, of two surfaces that are opposite to each other in the thickness direction of the multilayer structure, a first surface is the first major surface 101 of the mounting board 100, and a second surface is the second major surface 102 of the mounting board 100. The interconnection structure may be, for example, an interposer. The interposer may be an interposer made of a silicon substrate, or a substrate composed of multiple layers.

The first major surface 101 and the second major surface 102 of the mounting board 100 are apart from each other in the thickness direction D1 of the mounting board 100. The first major surface 101 and the second major surface 102 of the mounting board 100 cross the thickness direction D1 of the mounting board 100. The first major surface 101 of the mounting board 100 is, for example, perpendicular to the thickness direction D1 of the mounting board 100. However, the first major surface 101 may include, for example, a side surface of a conductive portion as a surface not perpendicular to the thickness direction D1. The second major surface 102 of the mounting board 100 is, for example, perpendicular to the thickness direction D1 of the mounting board 100. However, the second major surface 102 may include, for example, a side surface of a conductive portion as a surface not perpendicular to the thickness direction D1. On the first major surface 101 and the second major surface 102 of the mounting board 100, fine irregularities, or a depressed or raised portion may be formed. When viewed in plan view in the thickness direction D1 of the mounting board 100, the mounting board 100 is rectangular; but this is not to be interpreted as limiting, and the mounting board 100 may be, for example, square.

The radio-frequency module 1 includes, as a plurality of electronic components, the antenna terminal 10, the switch 20, a plurality (three in the example in the drawing) of first matching circuits 30, a plurality (three in the example in the drawing) of filters 40, a plurality (three in the example in the drawing) of second matching circuits 50, and a plurality (three in the example in the drawing) of low-noise amplifiers 60. This means that the plurality of electronic components include the first matching circuits 30, the filters 40, and the second matching circuits 50 that are configured to process radio-frequency signals.

The plurality of electronic components of the radio-frequency module 1 are individually mounted on the first major surface 101 or the second major surface 102 of the mounting board 100. On the first major surface 101, the first matching circuits 30, the filters 40, and the second matching circuits 50 are mounted (disposed) (see FIG. 2A). In other words, at the first major surface 101, a plurality of electronic components including the first matching circuits 30, the filters 40, and the second matching circuits 50 are mounted (disposed). At the second major surface 102, the switch IC 80 (an electronic component) including the switch 20 and the low-noise amplifiers 60 is mounted (disposed) (see FIG. 2B).

Figure 2A:
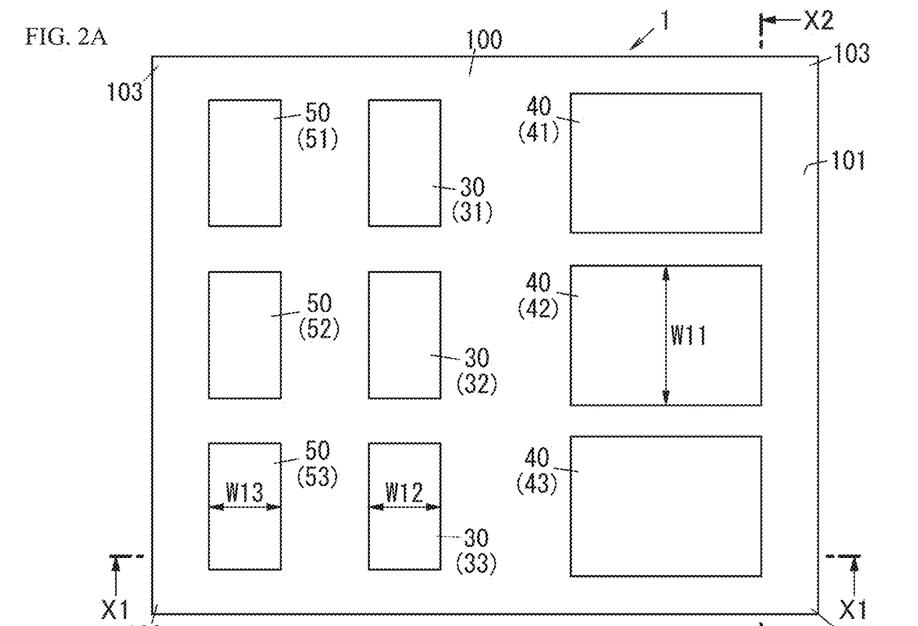
FIG. 2A is a plan view of the radio-frequency module.
Figure 2B:
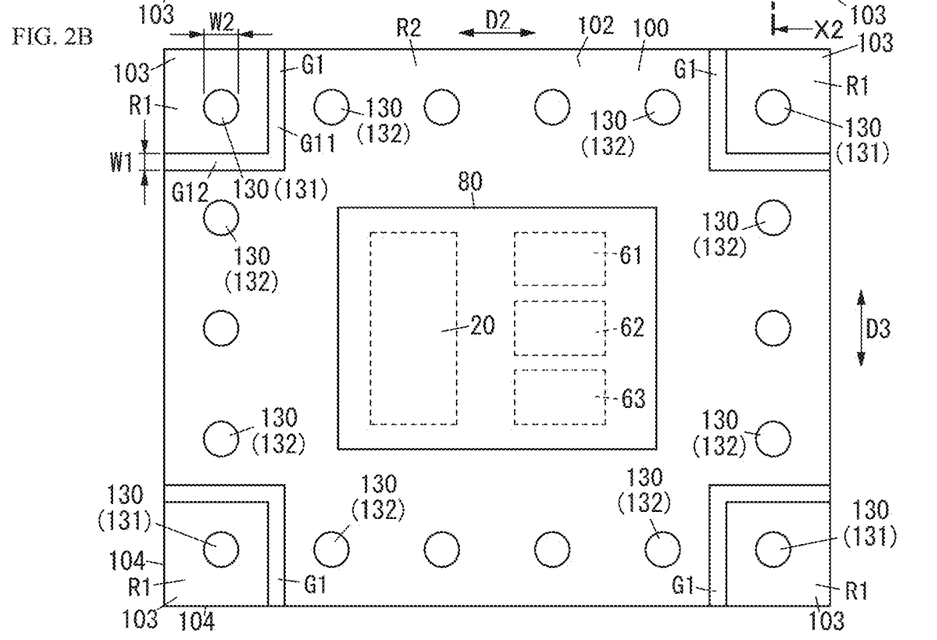
FIG. 2B is a bottom view of the radio-frequency module.

The radio-frequency module 1 includes, as illustrated in FIG. 2B, a plurality (18 in this example) of external connection terminals 130. The external connection terminals 130 are disposed on the second major surface 102 of the mounting board 100. The material of the external connection terminals 130 is, for example, a metal (for example, copper or a copper alloy). The external connection terminals 130 are columnar electrodes. In this instance, the columnar electrodes are, for example, cylindrical electrodes. The external connection terminals 130 have the same shape; but the external connection terminals 130 may have different shapes.

The external connection terminals 130 include the antenna terminal 10, the one or more ground terminals, and the signal output terminals 71, 72, and 73. The one or more ground terminals are, as described above, electrically coupled to the ground layer of the mounting board 100. The ground layer serves as the circuit ground of the radio-frequency module 1. The electronic components of the radio-frequency module 1 include electronic components electrically coupled to the ground layer.

The external connection terminals 130 includes first external connection terminals 131 that are positioned nearest to respective corners 103 of the mounting board 100 when the mounting board 100 is viewed in plan view (see FIG. 2B). The mounting board 100 has first regions R1 and a second region R2. When viewed in plan view in the thickness direction D1 of the mounting board 100, the first external connection terminals 131 are positioned in the first regions R1. When viewed in plan view in the thickness direction D1 of the mounting board 100, at least one electronic component (a first electronic component) of the plurality of electronic components disposed on the first major surface 101 of the mounting board 100 is positioned in the second region R2. When viewed in plan view in the thickness direction D1 of the mounting board 100, at least one of the external connection terminals 130 is positioned in the second region R2. Gaps G1 (a first gap) are formed between the first regions R1 and the second region R2 at the second major surface 102. When the mounting board 100 is viewed in plan view, the first external connection terminals 131 are surrounded by edges 104 of the mounting board 100 and the gaps G1. The gaps G1 are formed by, for example, laser machining.

Specifically, in the present embodiment, when viewed in plan view in the thickness direction D1 of the mounting board 100, the mounting board 100 is rectangular, and the mounting board 100 thus has a plurality (four in this instance) of corners 103. The external connection terminals 130 include a plurality (four in this instance) of first external connection terminals 131 that are positioned nearest to the respective corners 103. When the mounting board 100 is viewed in plan view, the first external connection terminals 131 are individually surrounded by the edges 104 of the mounting board 100 and the gaps G1 (see FIG. 2B). More specifically, each gap G1 includes a gap G11 elongated in a lateral direction D3 of the mounting board 100 and a gap G12 elongated in a longitudinal direction D2 of the mounting board 100. When the mounting board 100 is viewed in plan view, each first external connection terminal 131 is surrounded by the edge 104 elongated in the longitudinal direction D2 of the mounting board 100, the edge 104 elongated in the lateral direction D3 of the mounting board 100, the gap G11, and the gap G12. In the present embodiment, the gaps G11 and G12 have the same width. A width W1 of the gap G1, which will be described later, indicates the gap G11 (or the gap G12).

An end of each gap G1 in the thickness direction D1 of the mounting board 100 extends to a conductive layer L1 that is one of the conductive layers of the mounting board 100. This means that some portions of the conductive layer L1 are exposed at the gaps G1 (see FIGS. 3A and 3B).

The width W1 of each gap G1 is, for example, smaller than a width W2 (diameter) of the external connection terminals 130. The width W1 of each gap G1 is, for example, smaller than the width of the individual electronic components arranged at the first major surface 101. For example, the width W1 of each gap G1 is smaller than a width W11 of the filters 40 as the electronic components, a width W12 of the first matching circuits 30 as the electronic components, and a width W13 of the second matching circuits 50 as the electronic components. As used herein, the width of an electronic component is, for example, the distance across an electronic component in the lateral direction of the electronic component.

The width of the gap G11 is the same as the width of the gap G12, but this is not to be interpreted as limiting. The width of the gap G11 may be different from the width of the gap G12. When the width of the gap G11 is different from the width of the gap G12, the width W1 of the gaps G1 indicates the larger one of the width of the gap G11 and the width of the gap G12.

A depth W3 of each gap G1 is, for example, half or more as long as a thickness W4 of the mounting board 100 (see FIGS. 3A and 3B).

In the second region R2, second external connection terminals 132 of the external connection terminals 130 are disposed; the second external connection terminals 132 are positioned adjacent to the first external connection terminals 131 (see FIGS. 2B, 3A, and 3B). The individual gaps G1 are provided between the first external connection terminals 131 and the second external connection terminals 132 (see FIGS. 2B, 3A, and 3B). As used herein, the expression "the second external connection terminals are positioned adjacent to the first external connection terminals" means that the second external connection terminals are some of the external connection terminals 130, and no other external connection terminals 130 exist between the second external connection terminals and the first external connection terminals 131 in the alignment directions in which the first external connection terminals 131 and the second external connection terminals are arranged.

The radio-frequency module 1 further includes a first resin layer 110 (see FIGS. 3A and 3B). The first resin layer 110 is provided on the first major surface 101 side with respect to the mounting board 100 such that the electronic components disposed on the first major surface 101 of the mounting board 100 are covered by the first resin layer 110. In this instance, the first resin layer 110 seals the electronic components disposed on the first major surface 101 of the mounting board 100. The first resin layer 110 contains a resin. The first resin layer 110 may contain a filler as well as a resin. The first resin layer 110 is not illustrated in FIG. 2A.

The radio-frequency module 1 according to the first embodiment further includes a second resin layer 120 (a resin layer) (see FIGS. 3A and 3B). The second resin layer 120 is disposed on the second major surface 102 of the mounting board 100. The second resin layer 120 is provided on the second major surface 102 side with respect to the mounting board 100 such that the electronic components mounted on the second major surface 102 of the mounting board 100 are covered by the second resin layer 120, and the external connection terminals 130 are partially covered by the second resin layer 120. The second resin layer 120 is formed such that an end surface of each external connection terminal 130 is exposed. The second resin layer 120 contains a resin. The second resin layer 120 may contain a filler as well as a resin. The material of the second resin layer 120 may be either the same as or different from the material of the first resin layer 110. The second resin layer 120 is not illustrated in FIG. 2B.

The second resin layer 120 has through-holes 121 that are connected to the gaps G1. The external connection terminals 130 extend through the through-holes 121 in the second resin layer 120.

The radio-frequency module 1 is mountable on a motherboard (not illustrated in the drawings) that is an external substrate. Specifically, the external connection terminals 130 of the radio-frequency module 1 is able to be electrically coupled to the motherboard. In the present embodiment, the thermal expansion coefficient of the second resin layer 120 is smaller than the thermal expansion coefficient of the external substrate (the motherboard), and the thermal expansion coefficient of the mounting board 100 is smaller than the thermal expansion coefficient of the second resin layer 120. The individual thermal expansion coefficients are determined based on, for example, the material of the external substrate (the motherboard), the material of the second resin layer 120, and the material of the mounting board 100. Alternatively, the individual thermal expansion coefficients are determined, for example, by measuring a displacement caused by heat with respect to the external substrate (the motherboard), the second resin layer 120, and the mounting board 100.

(3) Effect

As described above, the radio-frequency module 1 of the embodiment includes the mounting board 100, the first electronic component (for example, the first matching circuits 30, the filters 40, the second matching circuits 50), and the external connection terminals 130. The mounting board 100 has the first major surface 101 and the second major surface 102 that are opposite to each other. The first electronic component is disposed on the first major surface 101. The external connection terminals 130 are disposed on the second major surface 102. The external connection terminals 130 include the first external connection terminals 131 that are positioned nearest to the corners 103 of the mounting board 100 among the external connection terminals 130 when viewed in plan view in the thickness direction D1 of the mounting board 100. The mounting board 100 has the first regions R1 and the second region R2. When viewed in plan view in the thickness direction D1 of the mounting board 100, the first external connection terminals 131 are positioned in the first regions R1. When viewed in plan view in the thickness direction D1 of the mounting board 100, the first electronic component is positioned in the second region R2. The gaps G1 are formed between the first regions R1 and the second region R2 at the second major surface 102. When viewed in plan view in the thickness direction D1 of the mounting board 100, the first external connection terminals 131 are surrounded by the edges 104 of the mounting board 100 and the gaps G1.

In this configuration, the mounting board 100 has the gaps G1 at the second major surface 102, and as a result, the first external connection terminals 131 are surrounded by the edges 104 of the mounting board 100 and the gaps G1. Given that heat is generated in the use of the radio-frequency module 1 electrically coupled to a motherboard that is an external substrate, when the mounting board 100 is deformed by the heat, the corners of the mounting board 100 are misshaped along with the motherboard. This reduces the thermal stress of the motherboard on the mounting board 100. Specifically, the thermal stress is eased because the gaps G1 serve as cushioning.

Characteristics of a component such as the radio-frequency module 1 are specified by JESD-A104, which is a JEDEC standard. Because the radio-frequency module 1 of the present embodiment has the configuration described above, the thermal stress of a motherboard on the mounting board 100 is reduced. Specifically, the thermal stress is eased because the gaps G1 serve as cushioning. As a result, degradation of characteristics under temperature cycling conditions is suppressed.

(4) Modifications

The following describes modifications to the embodiment.

(4.1) First Modification

In the embodiment, the individual gaps G1 are formed such that portions of the conductive layer L1, which is one of the conductive layers, are exposed at the gaps G1, but this is not to be interpreted as limiting.

At least one gap of the gaps G1 may extend through the mounting board 100 in the thickness direction D1.

A radio-frequency module 1A according to a first modification of the embodiment will be described with reference to FIG. 4A. Regarding the radio-frequency module 1A according to the first modification, the same constituent elements as the radio-frequency module 1 according to the first embodiment are assigned the same reference characters, and descriptions thereof are not repeated.

Figure 4A:
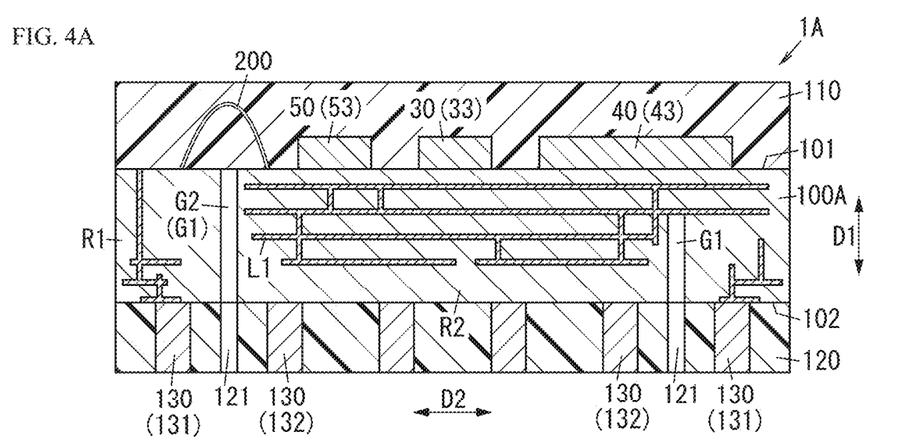
FIG. 4A is a sectional view of a radio-frequency module according to a first modification.

As illustrated in FIG. 4A, at least one gap G2 of the gaps G1 extends through a mounting board 100A of the radio-frequency module 1A of the first modification in the thickness direction D1 of the mounting board 100. As used herein, the expression "the gaps G1 are formed between the first regions R1 and the second region R2 at the second major surface 102" includes the case in which the gap G1 (G2) extends through the mounting board 100 in the thickness direction D1.

As a result, the gap G2 separates the first region R1 having the first external connection terminal 131 from the second region R2 having at least one of the external connection terminals 130.

In this case, for example, as illustrated in FIG. 4A, the first region R1 and the second region separated by the gap G2 are connected by a wire 200 at the first major surface 101. With this configuration, when the first region R1 of the first major surface 101 has, for example, an electronic component, the electronic component mounted in the first region R1 is electrically coupled to electronic components mounted in the second region 2.

Figure 4B:
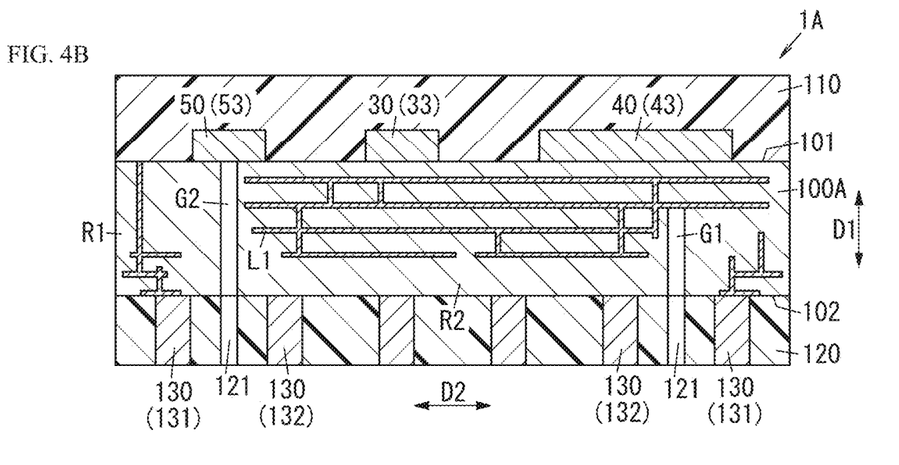
FIG. 4B is a sectional view of another radio-frequency module according to the first modification.

Alternatively, in the radio-frequency module 1A, as illustrated in FIG. 4B, the first region R1 and the second region R2 separated by the gap G2 may be connected by an electronic component such as the second matching circuit 50 (53) instead of the wire 200 illustrated in FIG. 4A.

(4.2) Second Modification

The mounting board 100 may further include gaps G3 (a second gap) each connecting two of the gaps G1 respectively formed around two of the first external connection terminals 131 arranged in one alignment direction.

A radio-frequency module 1B according to a second modification of the embodiment will be described with reference to FIG. 5. Regarding the radio-frequency module 1B according to the second modification, the same constituent elements as the radio-frequency module 1 according to the first embodiment are assigned the same reference characters, and descriptions thereof are not repeated.

Figure 5:
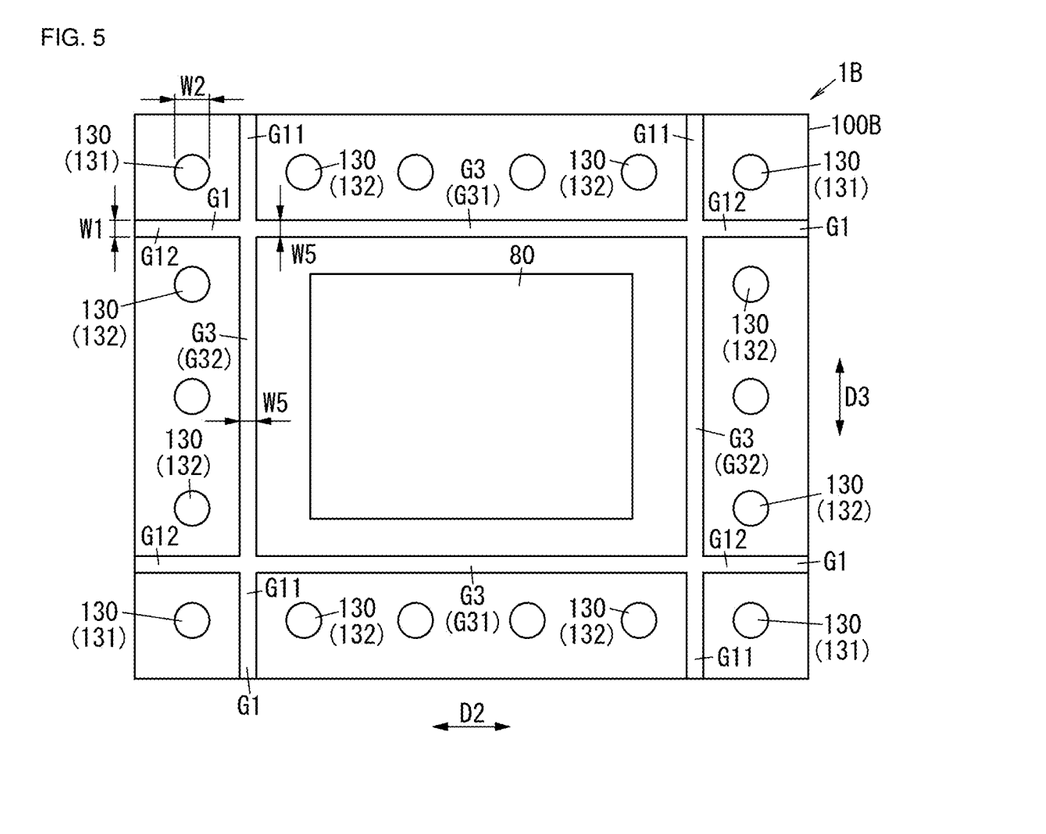
FIG. 5 is a bottom view of a radio-frequency module according to a second modification.

A mounting board 100B of the radio-frequency module 1B of the second modification includes, as well as the configuration of the mounting board 100 of the radio-frequency module 1 of the embodiment, two gaps G31 as the gaps G3 and two gaps G32 as the gaps G3 (see FIG. 5).

The two gaps G31 each connect two gaps (the gaps G12) of the gaps G1 respectively formed around two of the first external connection terminals 131 arranged in the longitudinal direction D2 of the mounting board 100B that is one alignment direction of the first external connection terminals 131.

The two gaps G32 each connect two gaps (the gaps G11) of the gaps G1 respectively formed around two of the first external connection terminals 131 arranged in the lateral direction D3 of the mounting board 100B that is one alignment direction of the first external connection terminals 131.

When an electronic component (for example, the switch IC 80) is mounted on the second major surface 102, the gaps G3 are formed around the switch IC 80 that is the electronic component mounted on the second major surface 102. In other words, the switch IC 80 is surrounded by the two gaps G31 and the two gaps G32.

It is sufficient that a width W5 of the gaps G3 is smaller than the width W2 of the external connection terminals 130 and the width of the electronic component; the width W5 of the gaps G3 may be either the same as or different from the width W1 of the gaps G1.

It is sufficient that the depth of the gaps G3 is half or more as long as the thickness W4 of the mounting board 100 (see FIGS. 3A and 3B); the depth of the gaps G3 may be either the same as or different from the depth W3 of the gaps G1 (see FIG. 3B).

The gaps G3 may extend through the mounting board 100B in the thickness direction D1 of the mounting board 100B.

(4.3) Third modification

In the second modification, when at least two of the external connection terminals 130 are arranged between two of the first external connection terminals 131 in one alignment direction in which the two of the first external connection terminals 131 are arranged, supplementary gaps other than the gaps G1 may be provided between the at least two of the external connection terminals 130.

Figure 6:
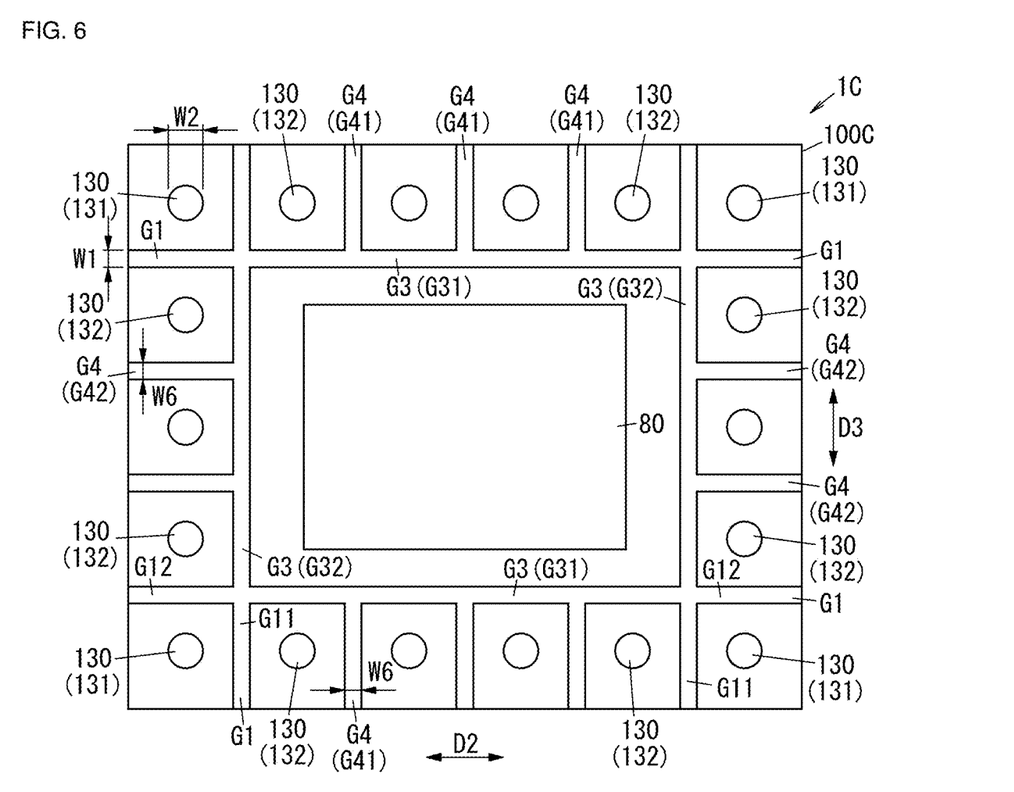
FIG. 6 is a bottom view of a radio-frequency module according to a third modification.

The following describes a radio-frequency module 1C according to a third modification of the embodiment with reference to FIG. 6. Regarding the radio-frequency module 1D according to the third modification, the same constituent elements as the radio-frequency module 1B according to the second modification are assigned the same reference characters, and descriptions thereof are not repeated.

A mounting board 100C of the radio-frequency module 1C of the third modification includes, as well as the configuration of the mounting board 100B of the second modification, six gaps G41 as supplementary gaps G4 (a third gap) different from the gaps G1 and four gaps G42 as the supplementary gaps G4 different from the gaps G1 (see FIG. 6).

Two of the gaps G41 are individually provided between two adjacent external connection terminals 130 arranged between two of the first external connection terminals 131 arranged in the longitudinal direction D2 of the mounting board 100B that is one alignment direction of the first external connection terminals 131. In the example in FIG. 6, four external connection terminals 130 are provided between two of the first external connection terminals 131 arranged in the longitudinal direction D2 of the mounting board 100B.

Two of the gaps G42 are individually provided between two adjacent external connection terminals 130 arranged between two of the first external connection terminals 131 arranged in the lateral direction D3 of the mounting board 100B that is one alignment direction of the first external connection terminals 131. In the example in FIG. 6, three external connection terminals 130 are provided between two of the first external connection terminals 131 arranged in the lateral direction D3 of the mounting board 100B.

The external connection terminal 130 between two of the first external connection terminals 131 arranged in one alignment direction is surrounded by two of the gaps G4, a portion of the gap G3, and the edge 104 of the mounting board 100C. Otherwise, the external connection terminal 130 between two of the first external connection terminals 131 arranged in one alignment direction is surrounded by the gap G1 (the gap G11 or the gap G12), one of the supplementary gaps G4, a portion of the gap G3, and the edge 104 of the mounting board 100C.

It is sufficient that a width W6 of the gaps G4 is smaller than the width W2 of the external connection terminals 130 and the width of the electronic component (see FIG. 2A); the width W6 of the gaps G4 may be either the same as or different from the width W1 of the gaps G1.

It is sufficient that the depth of the supplementary gaps G4 is half or more as long as the thickness W4 of the mounting board 100 (see FIGS. 3A and 3B); the depth of the gaps G3 may be either the same as or different from the depth W3 of the gaps G1 (see FIG. 2B).

The supplementary gaps G4 may be provided between at least two (three in this example) external connection terminals 130 disposed between two of the first external connection terminals 131 arranged in the longitudinal direction D2 of the mounting board 100B. Alternatively, the supplementary gaps G4 may be provided between at least two (three in this example) external connection terminals 130 disposed between two of the first external connection terminals 131 arranged in the lateral direction D3 of the mounting board 100B.

The supplementary gaps G4 may extend through the mounting board 100C in the thickness direction D1 of the mounting board 100C.

(4.4) Fourth Modification

Figure 7:
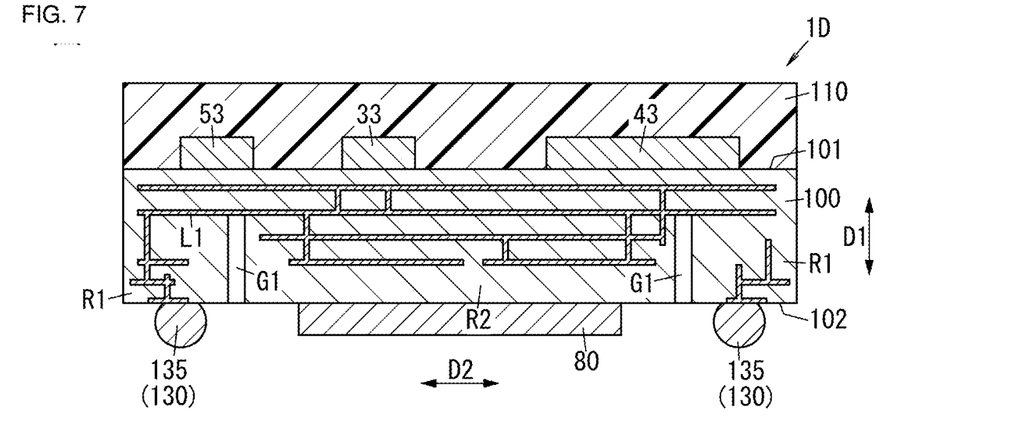
FIG. 7 is a sectional view of a radio-frequency module according to a fourth modification.

A radio-frequency module 1D according to a fourth modification of the embodiment will be described with reference to FIG. 7. Regarding the radio-frequency module 1D according to the fourth modification, the same constituent elements as the radio-frequency module 1 according to the first embodiment are assigned the same reference characters, and descriptions thereof are not repeated.

The radio-frequency module 1D according to the fourth modification differs from the radio-frequency module 1 according to the embodiment in that the external connection terminals 130 are ball bumps 135. Additionally, the radio-frequency module 1D according to the fourth modification differs from the radio-frequency module 1 according to the embodiment in that the second resin layer 120 of the radio-frequency module 1 according to the embodiment is not included. The radio-frequency module 1D according to the fourth modification may include an underfill provided in a space between the switch IC 80 and the second major surface 102 of the mounting board 100.

The material of the ball bumps 135 respectively forming the external connection terminals 130 is, for example, gold, copper, or solder.

The external connection terminals 130 may include both the external connection terminals 130 formed by the ball bumps 135 and the external connection terminals 130 formed by columnar electrodes in a mixed manner.

The radio-frequency module 1D according to the fourth modification provides stable communication similarly to the radio-frequency module 1.

(4.5) Fifth Modification

The radio-frequency module 1 according to the present embodiment is adaptable for a radio-frequency transmit module for receiving radio-frequency transmit signals outputted by the RF signal processing circuit 502 and outputting the radio-frequency transmit signals to, for example, the antenna 510. In this case, the radio-frequency transmit module includes, for example, a plurality of power amplifiers for amplifying transmit signals instead of the low-noise amplifiers 60.

Additionally, in the radio-frequency transmit module, the filters 40 are transmit filters for passing transmit signals in particular frequency bands outputted from the signal processing circuit 501 and outputs the transmit signals to the antenna terminal 10.

In the radio-frequency transmit module, the second matching circuits 50 are electrically coupled to the filters 40 (transmit filters) in one-to-one correspondence. The second matching circuits 50 are electrically coupled to the power amplifiers in one-to-one correspondence. The second matching circuits 50 respectively provide impedance matching between the filters 40 and the power amplifiers that are electrically coupled.

Transmit signals flow through the power amplifiers, the second matching circuits 50, the filters 40, the switch 20, and the antenna terminal 10 in the order presented.

(4.6) Sixth Modification

The electronic components are mounted on the first major surface 101 or the second major surface 102 of the mounting board 100, but this is not to be interpreted as limiting.

The electronic components may be mounted on only the first major surface 101 of the mounting board 100. When the electronic component are mounted on only the first major surface 101, the second resin layer 120 is unnecessary.

(4.7) Seventh Modification

In the embodiment, all the first external connection terminals 131 disposed in the respective corners of the mounting board 100 are surrounded by the edges 104 of the mounting board 100 and the gaps G1, but this is not to be interpreted as limiting.

It is sufficient that at least one of the first external connection terminals 131 is surrounded by the edges 104 of the mounting board 100 and the gap G1.

(4.8) Eighth Modification

In the embodiment, only the first external connection terminals 131 are surrounded by the edges 104 of the mounting board 100 and the gaps G1, but this is not to be interpreted as limiting.

As well as the first external connection terminals 131, one or more of the external connection terminals 130 arranged together with the first external connection terminals 131 in one alignment direction (the longitudinal direction D2 or the lateral direction D3) of the external connection terminals 131 may be surrounded by the edges 104 of the mounting board 100 and the gaps G1.

Conclusion

As described above, a radio-frequency module (1; 1A; 1B; 1C; 1D) of a first aspect includes a mounting board (100; 100A; 100B; 100C), a first electronic component (for example, the first matching circuits 30, the filters 40, the second matching circuits 50), and a plurality of external connection terminals (130). The mounting board (100; 100A; 100B; 100C) has a first major surface (101) and a second major surface (102) that are opposite to each other. The first electronic component is disposed on the first major surface (101). The plurality of external connection terminals (130) are disposed on the second major surface (102). The plurality of external connection terminals (130) include a first external connection terminal (131) that is positioned nearest to a corner (103) of the mounting board (100) among the plurality of external connection terminals (130) when viewed in plan view in a thickness direction (D1) of the mounting board (100; 100A; 100B; 100C). The mounting board (100; 100A; 100B; 100C) has a first region (R1) and a second region R2. When viewed in plan view in the thickness direction (D1) of the mounting board (100; 100A; 100B; 100C), the first external connection terminal (131) is positioned in the first region (R1). When viewed in plan view in the thickness direction (D1) of the mounting board (100; 100A; 100B; 100C), the first electronic component is positioned in the second region (R2). A gap (G1; G2) is formed between the first region (R1) and the second region (R2) at the second major surface (102). The first external connection terminal (131) is surrounded by an edge (104) of the mounting board (100; 100A; 100B; 100C) and the gap (G1; G2) when viewed in plan view in the thickness direction (D1) of the mounting board (100; 100A; 100B; 100C).

With this configuration, when heat is generated in the use of the radio-frequency module (1; 1A; 1B; 1C; 1D) electrically coupled to a motherboard as an external substrate, the thermal stress of the motherboard on the mounting board (100) is reduced. Specifically, the thermal stress is eased because the gap (G1) serves as cushioning. As a result, degradation of characteristics under temperature cycling conditions is suppressed.

In the radio-frequency module (1; 1A; 1B; 1C; 1D) of a second aspect, with respect to the first aspect, the mounting board (100; 100A; 100B; 100C) has a plurality of corners (103). The plurality of external connection terminals (130) include a plurality of first external connection terminals (131) that are positioned nearest to the respective corners (103). The first external connection terminals (131) are each surrounded by an edge (104) of the mounting board (100; 100A; 100B; 100C) and the gap (G1; G2) when viewed in plan view in the thickness direction (D1) of the mounting board (100; 100A; 100B; 100C).

This configuration further ensures that degradation of characteristics under temperature cycling conditions is suppressed.

In the radio-frequency module (1B; 1C) of a third aspect, with respect to the second aspect, the mounting board (100B; 100C) further includes a second gap (the gaps G3) connecting two first gaps, which are the gaps (G1; G2), and two first external connection terminals (131) of the first external connection terminals (131) are respectively surrounded by the two first gaps.

This configuration further ensures that degradation of characteristics under temperature cycling conditions is suppressed.

In the radio-frequency module (1C) of a fourth aspect, with respect to the third aspect, the plurality of external connection terminals (130) further include at least two second external connection terminals (132) disposed between the two first external connection terminals (131) in the direction in which the two first external connection terminals (131) are arranged. The mounting board (100C) further includes a third gap (the gaps G4) formed between the at least two second external connection terminals (132) in addition to the gap (G1; G2).

In this configuration, the gaps (G1; G4) are provided among two first external connection terminals (131) and at least two external connection terminals (130) that are arranged in one alignment direction, and as a result, degradation of isolation between, for example, filters (41) and (42) in communication is suppressed.

The radio-frequency module (1B; 1C) of the fifth aspect, with respect to the third or fourth aspect, further includes a second electronic component (for example, the switch IC 80) disposed on the second major surface (102). The second gap (the gaps G3) is formed around the second electronic component.

This configuration further ensures that degradation of characteristics under temperature cycling conditions is suppressed.

In the radio-frequency module (1; 1A; 1B; 1C; 1D) of a sixth aspect, with respect to any of the first to fifth aspects, the mounting board (100; 100A; 100B; 100C) is a multilayer substrate including a conductive layer (L1). A portion of the conductive layer is exposed at the gap (G1).

This configuration ensures that, when the gap (G1) is formed by laser machining, the conductive layer stops the gap (G1) from extending farther in the depth direction. This means that this configuration facilitates formation of the gap (G1).

In the radio-frequency module (1A) of a seventh aspect, with respect to any of the first to fifth aspects, the gap (G2) extends through a mounting board (100A).

This configuration suppresses isolation degradation in communication.

In the radio-frequency module (1A) of an eighth aspect, with respect to the seventh aspect, the first region (R1) and the second region (R2) are connected by a wire (200) at the first major surface (101).

This configuration provides electrical connection between electronic components disposed in the first region (R1) and electronic components disposed in the second region (R2).

The radio-frequency module (1A) of a ninth aspect, with respect to the seventh or eighth aspect, includes a plurality of electronic components (for example, the first matching circuits 30, the filters 40, and the second matching circuits 50) disposed on the first major surface (101), including the first electronic component. The first region (R1) and the second region (R2) are connected by at least one electronic component (for example, the second matching circuit 50) of the plurality of electronic components at the first major surface (101).

This configuration provides electrical connection between electronic components disposed in the first region (R1) and electronic components disposed in the second region (R2) via an electrical component.

The radio-frequency module (1; 1A; 1B; 1C) of a tenth aspect, with respect to any of the first to ninth aspects, further includes a second electronic component (for example, the switch IC 80) disposed at the second major surface (102) and a resin layer (for example, the second resin layer 120). The resin layer covers the second electronic component and a portion of each of the plurality of external connection terminals (130). The resin layer has a through-hole (121) connected to the gap (G1; G2). The plurality of external connection terminals (130) extend through the resin layer. The plurality of external connection terminals (130) are coupled to an external substrate. The thermal expansion coefficient of the resin layer is smaller than the thermal expansion coefficient of the external substrate, and the thermal expansion coefficient of the mounting board (100; 100A; 100B; 100C) is smaller than the thermal expansion coefficient of the resin layer.

This configuration reduces the thermal stress of the external substrate on the mounting board (100).

In the radio-frequency module (1; 1A; 1B; 1C; 1D) of an eleventh aspect, with respect to any of the first to tenth aspects, a second external connection terminal (132) adjacent to the first external connection terminal (131) among the plurality of external connection terminals (130) is disposed in the second region (R2). The gap (G1; G2) is provided between the first external connection terminal (131) and the second external connection terminal (132).

This configuration suppresses isolation degradation in communication by means of the first external connection terminal (131) and in communication by means of the second external connection terminal (132).

In the radio-frequency module (1; 1A; 1B; 1C; 1D) of a twelfth aspect, with respect to any of the first to eleventh aspects, the depth (W3) of the gap (G1; G2) is half or more as long as the thickness (W4) of the mounting board.

This configuration suppresses degradation of characteristics under temperature cycling conditions.

In the radio-frequency module (1; 1A; 1B; 1C; 1D) of a thirteenth aspect, with respect to any of the first to twelfth aspects, it is smaller than the width of at least one of the plurality of external connection terminals (130).

This configuration suppresses degradation of characteristics under temperature cycling conditions.

In the radio-frequency module (1; 1A; 1B; 1C; 1D) of a fourteenth aspect, with respect to any of the first to thirteenth aspects, the width (W1) of the gap (G1) is smaller than the width (for example, the width W11, W12, W13) of the first electronic component.

This configuration suppresses degradation of characteristics under temperature cycling conditions.

A communication device (500) of a fifteenth aspect includes the radio-frequency module (1; 1A; 1B; 1C; 1D) of any of the first to fourteenth aspects and a signal processing circuit (501) configured to process a signal transferred or to be transferred through the radio-frequency module (1; 1A; 1B; 1C; 1D).

This configuration suppresses degradation of characteristics under temperature cycling conditions.

REFERENCE SIGNS LIST 1, 1A, 1B, 1C, 1D radio-frequency module
10 antenna terminal
20 switch
21 common terminal
22, 23, 24 selection terminal
30, 31, 32, 33 first matching circuit
40, 41, 42, 43 filter
50, 51, 52, 53 second matching circuit
60, 61, 62, 63 low-noise amplifier
71, 72, 73 signal output terminal
80 switch IC
100, 100A, 100B, 100C mounting board
101 first major surface
102 second major surface
110 first resin layer
120 second resin layer (resin layer)
130 external connection terminal
131 first external connection terminal
132 second external connection terminal
135 ball bump
200 wire
500 communication device
501 signal processing circuit
502 RF signal processing circuit
503 baseband signal processing circuit
510 antenna
D1 thickness direction
D2 longitudinal direction
D3 lateral direction
G1, G2 gap (first gap)
G3 gap (second gap)
G4 gap (third gap)
G11, G12, G31, G32, G41, G42 gap
L1 conductive layer
R1 first region
R2 second region
W1, W2, W11, W12, W13 width

The invention claimed is:
1. A radio-frequency circuit device comprising:
a mounting board having a first surface and a second surface that are opposite to each other,
a first electronic component disposed on the first surface; and a plurality of external connection terminals disposed on the second surface, wherein the plurality of external connection terminals include a first external connection terminal that is positioned nearest to a corner of the mounting board among the plurality of external connection terminals when viewed in plan view in a thickness direction of the mounting board, the mounting board includes a first region in which the first external connection terminal is positioned when viewed in plan view in the thickness direction of the mounting board, and a second region in which the first electronic component is positioned when viewed in plan view in the thickness direction of the mounting board, in the mounting board, a gap between the first region and the second region extends from the second surface towards the first surface of the mounting board, and the first external connection terminal is surrounded by an edge of the mounting board and the gap when viewed in plan view in the thickness direction of the mounting board.

2. The radio-frequency circuit device according to claim 1, wherein the corner is one of a plurality of corners of the mounting board, the first external connection terminal is one of a plurality of first external connection terminals that are included in the plurality of external connection terminals and that are positioned nearest to the respective corners of the mounting board among the plurality of external connection terminals, and the plurality of first external connection terminals are each surrounded by an edge of the mounting board and the gap when viewed in plan view in the thickness direction of the mounting board.

3. The radio-frequency circuit device according to claim 2, wherein the gap is one of two gaps formed at the second surface between the first region and the second region, the mounting board further includes a second gap connecting two first gaps that are the two gaps, and two first external connection terminals of the plurality of first external connection terminals are respectively surrounded by the two first gaps.

4. The radio-frequency circuit device according to claim 3, wherein the plurality of external connection terminals further include at least two second external connection terminals disposed between the two first external connection terminals in a direction in which the two first external connection terminals are arranged, and the mounting board further includes a third gap formed between the at least two second external connection terminals in addition to the gap.

5. The radio-frequency circuit device according to claim 3, further comprising:

a second electronic component disposed on the second surface, wherein the second gap is formed around the second electronic component.

6. The radio-frequency circuit device according to claim 1, wherein the mounting board is a multilayer substrate including a conductive layer, and a portion of the conductive layer is exposed at the gap.

7. The radio-frequency circuit device according to claim 1, wherein the gap extends through the mounting board.

8. The radio-frequency circuit device according to claim 7, wherein the first region and the second region are connected by a wire at the first surface.

9. The radio-frequency circuit device according to claim 7, further comprising:

a plurality of electronic components disposed on the first surface, the plurality of electronic components including the first electronic component, wherein the first region and the second region are connected by at least one electronic component of the plurality of electronic components at the first surface.

10. The radio-frequency circuit device according to claim 1, further comprising:

a second electronic component disposed on the second surface; and a resin layer covering the second electronic component and a portion of each of the plurality of external connection terminals, wherein the resin layer has a through-hole connected to the gap, the plurality of external connection terminals extend through the resin layer, the plurality of external connection terminals are coupled to an external substrate, a thermal expansion coefficient of the resin layer is smaller than a thermal expansion coefficient of the external substrate, and a thermal expansion coefficient of the mounting board is smaller than the thermal expansion coefficient of the resin layer.

11. The radio-frequency circuit device according to claim 1, wherein a second external connection terminal adjacent to the first external connection terminal among the plurality of external connection terminals is disposed in the second region, and the gap is provided between the first external connection terminal and the second external connection terminal.

12. The radio-frequency circuit device according to claim 1, wherein a depth of the gap is half or more as long as a thickness of the mounting board.

13. The radio-frequency circuit device according to claim 1, wherein a width of the gap is smaller than a width of at least one external connection terminal of the plurality of external connection terminals.

14. The radio-frequency circuit device according to claim 1, wherein a width of the gap is smaller than a width of the first electronic component.

15. A communication device comprising:

the radio-frequency circuit device according to claim 1; and a signal processing circuit configured to process a signal transferred or to be transferred through the radio-frequency circuit device.

16. The radio-frequency circuit device according to claim 4, further comprising:

a second electronic component disposed on the second surface, wherein the second gap is formed around the second electronic component.

17. The radio-frequency circuit device according to claim 2, further comprising:
- a second electronic component disposed on the second surface; and
- a resin layer covering the second electronic component and a portion of each of the plurality of external connection terminals, wherein the resin layer has a through-hole connected to the gap,
the plurality of external connection terminals extend through the resin layer,
the plurality of external connection terminals are coupled to an external substrate,
a thermal expansion coefficient of the resin layer is smaller than a thermal expansion coefficient of the external substrate, and
a thermal expansion coefficient of the mounting board is smaller than the thermal expansion coefficient of the resin layer.

18. The radio-frequency circuit device according to claim 17, wherein
- a second external connection terminal adjacent to the first external connection terminal among the plurality of external connection terminals is disposed in the second region, and the gap is provided between the first external connection terminal and the second external connection terminal.

19. The radio-frequency circuit device according to claim 2, wherein
- a width of the gap is smaller than a width of at least one external connection terminal of the plurality of external connection terminals.

20. The radio-frequency circuit device according to claim 2, wherein
- a width of the gap is smaller than a width of the first electronic component.

* * * * *